United States Patent [19]

Slocum et al.

[11] Patent Number: 5,472,367
[45] Date of Patent: Dec. 5, 1995

[54] MACHINE TOOL APPARATUS AND LINEAR MOTION TRACK THEREFOR

[75] Inventors: Alexander H. Slocum, Concord, N.H.; John H. Olsen, Vashon, Wash.

[73] Assignee: OMAX Corporation, Auburn, Wash.

[21] Appl. No.: 134,524

[22] Filed: Oct. 7, 1993

[51] Int. Cl.$^6$ ................................................. B24B 47/22
[52] U.S. Cl. ................... 451/5; 451/14; 451/75; 451/150; 451/152
[58] Field of Search ................................. 451/5, 11, 14, 451/75, 119, 150, 152, 360; 409/80, 210, 211, 212; 82/172; 83/113; 74/89.15, 428.81 B; 29/563, 27 R, 34 B

[56] References Cited

U.S. PATENT DOCUMENTS

| | | | |
|---|---|---|---|
| 2,220,002 | 10/1940 | Rollman et al. | 51/34 C |
| 3,564,971 | 2/1971 | Wagner et al. | 409/212 |
| 3,932,961 | 1/1976 | Pagella et al. | 51/165.8 |
| 4,524,544 | 6/1985 | Habib | 51/34 C |
| 4,557,245 | 12/1985 | Bieri | 125/14 |
| 4,606,150 | 8/1986 | Grimm | 51/34 C |
| 4,907,371 | 3/1990 | Shoda et al. | 51/34 C |
| 4,987,668 | 1/1991 | Roesch | 483/30 |
| 5,052,089 | 10/1991 | Gadaud et al. | 29/27 R |
| 5,154,643 | 10/1992 | Catania et al. | 29/34 B |
| 5,186,157 | 2/1993 | Bieri | 51/166 TS |
| 5,214,972 | 6/1993 | Larson et al. | 74/89.15 |

*Primary Examiner*—Maurina T. Rachuba
*Attorney, Agent, or Firm*—Graybeal Jackson Haley & Johnson

[57] ABSTRACT

A machine tool apparatus, and a linear motion track therefore, are disclosed where the linear motion track is comprised of a tube having a circular cross-section with at least two bearings longitudinally disposed on opposite exterior sides of the tube such that the tube forms a pair of arches joined by the two bearings. The tube arches minimize localized bending moments when radial or moment loads are applied to the tube arches through the bearings and from the longitudinally slidable carriage on the tube. In addition to the linear motion track, the machine tool apparatus also includes a table, for supporting a workpiece, to which the linear motion track is attached, and a machine tool attached to the linear motion track.

26 Claims, 5 Drawing Sheets

MACHINE TOOL APPARATUS AND LINEAR MOTION TRACK THEREFOR

BACKGROUND OF THE INVENTION

The present invention relates to a machine tool designed for use in adverse environments, such as for high pressure jet abrasive waterjet cutting, that has a relatively open structure to allow large workpieces to be manipulated in the structure, while maintaining a high degree of rigidity, and therefore accuracy, and having its axes being readily tightly completely sealable with bellows to prevent any possibility of contamination, even under a high pressure mist, reaching the precision bearings and ballscrews. More specifically, the invention describes an open C frame structure where the principle axes of linear motion are in a horizontal plane along the back of the C and projecting forward horizontally from the back of the C, which forms an XY motion system, and an optional vertical linear motion axes for tool height adjustment. The tool can be a high pressure waterjet nozzle, routing head, or laser beam focusing and pointing mechanism.

High pressure waterjet cutting systems evolved in the 1970s as an effective means for cutting materials ranging from delicate fabrics to wood to plastic to stone to metals (with abrasive materials in the flow stream). Most waterjet machines have been based on revolute axes-based robot systems, which tend to be inaccurate owing to the fact that angular motion joints have angular errors in them which are amplified by the robot arms' lengths. Larger systems were based on traditional machine tool designs that used conventional sealing systems for the linear axes which are not robust at resisting penetration of high pressure abrasive mists generated by the waterjet cutting process. As a result, the former type of system tended to be expensive and inaccurate, and the latter type of system tended to be expensive for maintenance. In addition, the large Cartesian machine tool systems that were designed tended to be far to large and expensive for the average job shop which actually represented the greatest business potential for waterjet cutting applications.

Other attempts to develop modular linear axes include the recent development of NSK Corporation in Japan of a modular linear motion system which they call their "mono-carrier" (patent pending). This design uses an open channel shape with the linear bearings on the inside edges of the channel. The ballscrew is placed in the center of the channel and drives the carriage which is also placed in the center of the channel. The system is sealed by belt-type seals that form a sliding seal with a metal cover with longitudinal slits that covers the channel's open side. The novel feature of this design is claimed that it incorporates the bearing races directly into the structure. However, the sliding belt-type seals will have a tendency to roll dirt particles back and forth which enhances their penetration rate into the inside of the system where they will soon abrade the bearings and ballscrew. In addition, the open C shape of the system is structurally very inefficient at resisting torsional loads; hence angular (twist) errors under load will be large, and they will be amplified by the distance between the bearings and the tool tip to cause a large equivalent displacement error. This angular error amplification is known as an Abbe error and it is discussed and illustrated in detail in the textbook *Precision Machine Design* by Alexander H. Slocum (©1992 by Prentice-Hall, Inc. ISBN 0-13-719972-4).

Still another, and older, modular axis design is marketed by Anorad Corporation in Hauppauge New York. This system also uses an open channel structure with the linear bearing races on the inside surfaces of the channel flanges, and the carriage held between the flanges by modular linear bearings that utilize the races in the flanges, and driven by a ballscrew or linear electric motor. This system is typically sealed by a rectangular channel shaped bellows system that mates with the channel-shaped structural system. The interface between the bellows and the structure is of a sliding type which once again can be penetrated by an abrasive mist and lead to early failure of the system.

Many other types of machine, such as coordinate measuring machines and milling machines, have utilized an open C frame concept with a horizontal axis along the back of the C and a second horizontal motion axis cantilevered off of the first and projecting forward. In all of these instances, the rear horizontal axis is typically a solid member with bearings bolted in a horizontal plane to a flat surface and a rectangular channel shaped bellows for sealing. Application of this common design methodology to abrasive mist situations has led to early failures of the machines' linear motion drive components. In some large cantilevered arm gantry robots the rear horizontal axis is supported by posts, but the open channel concept has still been used which is structurally inefficient for resisting large moment loads created by the cantilevered forward projecting axis. In addition, the bellows sealing methods have been comprised of channel shaped bellows that allow abrasive mist to seep through their sliding contact interface with the axis, and the horizontal flat surface of the bellows collects abrasive dirt that abrades its way through the bellows by the contraction/expansion cycling of the bellows' folds as the axis moves.

U.S. Pat. No. 1,937,408 issued to Johnson, U.S. Pat. No. 2,007,180 issued to Doran et al., and U.S. Pat. No. 2,456,041 issued to Baker all generally disclose "open frame" type linear motion tooling machines operable by screw-type drives.

U.S. Pat. No. 3,918,331 issued to Svanstrom teaches an automatic lathe having a horizontal spindle and turret. The spindle is arranged in a spindle headstock which is rectilinearly movable in a direction perpendicular to the center line of the spindle, the turret being rectilinearly movable in a direction perpendicular to the direction of movement of the spindle headstock. The axis of rotation of the turret is perpendicular to the center line of the spindle and at least substantially parallel to the direction of movement of the spindle headstock. Turret is adapted to hold tools for internal as well as external machining operations.

U.S. Pat. No. 4,282,763 issued to Griebeler discloses an apparatus for providing oscillatory motion. The apparatus comprises drive means and an adjustable member to provide a lever of the first, second or third class, or a means having no leverage component.

U.S. Pat. No. 4,447,178 issued to Esser discloses a horizontal drilling and milling machine which comprises a vertically movable headstock and a spindle sleeve mounted for horizontal run-out from the headstock. Typically, an outer end of the spindle sleeve undergoes a vertical deflection relative to the headstock during run-out, which deflection is an exponentially function of the extent of the run-out. A correcting means is connected to the headstock to move the latter as the run-out proceeds, to effect a vertical correction displacement of the forward end of the spindle sleever, which displacement is the same exponential function of the extent of the run-out as that of the vertical deflection relative to the headstock. Correction is achieved by comparing a signal indicative of the extent of the run-out, with a predetermined exponential function for the particular spindle sleeve and tool, and generating a suitable correction signal in response thereto. A memory and computer device is employed to make the necessary comparison. The memory and computer device transmit a signal to a motor, which motor is arranged to displace a reversing roll around which a cable is extended. The ends of the cable are connected between the headstock and counterweight. Radial movement of the reversing roll causes the headstock to be inclined in a vertical plane. A motion transmitting mechanism between the motor and the reversing roll enables precise movements to be made even by a motor rotating at high rpm.

U.S. Pat. No. 4,564,995 issued to Kase discloses a composite machine tool for metal working that has a pair of vertical columns. On the front and rear sides of the vertical columns, there are provided a vertical lathe and a milling machine, respectively, able to be driven and operated independently of each other. Machining by these machine tools is effected on a workpiece rested on a pallet. A pallet transfer apparatus for conveying a succession of pallets with workpieces is provided between the vertical lathe and the milling machine and between the vertical columns. When each turning operation in the vertical lathe is finished, the corresponding pallet with the workpiece rested thereon is immediately conveyed into the milling machine by the pallet transfer apparatus. The composite machine tool is particularly useful in reducing the time for conveying comparatively heavy workpieces.

U.S. Pat. No. 4,614,128 issued to Fickler discloses a linear drive device which operates with two motors which are mounted on the outer ends of two housing parts which are locked against rotation and can be telescopically moved into each other. A motor drives a threaded rod. By means of this design, a compast drive device is procured in the case of which all mechanical parts are located inside of the housing.

U.S. Pat. No. 4,986,725 issued to Geka discloses an apparatus for transporting a machine tool such as a robot arm which comprises: upper and lower track rails each having a square or circular cross-sectional shape which are horizontally arranged in parallel so as to be away from each other in the vertical direction; and a casing slidably inserted therebetween. Rack tooth trains are formed on the lower surface of the upper track rail and on the upper surface of the lower track rail. The casing has an almost H-shaped cross-sectional shape and comprises a casing main body and two side plates attached at both end surfaces thereof. Rail side track grooves and casing side track grooves are formed on the inner wall surfaces of the track rails and casing main body. Balls are inserted between the corresponding opposite track grooves. A return passage is formed in the casing main body, ball direction turning passages are formed in the side plates, and the return passage is coupled with the casing side track grooves, thereby forming an infinity circulating passage for the balls. A pinion is rotatably arranged at the central position in the longitudinal and transversal directions of the casing main body. When the lower track rail is fixed to the fixed table and the casing main body is moved, the upper track rail moves in the same direction as the casing at the double speed.

U.S. Pat. No. 4,651,601 issued to Sasaki teaches a device for preventing a collision between a work holder and a tool in numerical control equipment for a turret punch press. A region occupied by the work holder in a mechanical coordinate system, is stored in a work holder region storing memory, and the sizes of a plurality of tool posts of a turret, or the sizes of tools received in the tool posts, are stored in a tool post shape storing memory. At the time of tool selection, a punching inhibit computing circuit computes a punching inhibit region for a selected one of the tools on the basis of the stored contents of the work holder region storing memory and the tool post shape storing memory. Immediately before the execution of a punch command, a collision preventing circuit checks whether the position of the selected tool is within the punching inhibit region or not, and if so, it stops the operation of the machine.

U.S. Pat. No. 4,987,668 issued to Roesch discloses a machine tool where the spindle of the machine-tool is mounted on a carriage movable along a horizontal transverse member which is carried by the columns of a part of the frame of the machine having the shape of a closed porch, and which is situated in front of these columns. This transverse member moves vertically along the columns. The workpiece-carrying table, which can rotate on itself, is mounted on a carriage movable in a direction parallel to the spindle axis on a portion of the frame situated in front of the porch. Thus, whatever the extreme positions of the movable elements might be, no cantilever condition is produced which could generate machine deformations.

U.S. Pat. No. 5,052,089 issued to Gadaud et al. discloses a machine tool which combines the following three features: the workpiece holder rotates around an axis which is referred to as horizontal turning axis and is parallel to one (X) of the three orthogonal axes (X, Y, Z), the said axis (C) overlying a tale the flat upper-face of which is parallel to said turning axis (C) and comprises means for fastening one or more support and/or centering means; the toolholder comprises two clamping mandrels, one for a stationary tool and the other for a rotary tool; the workpiece holder is in relation with drive means which confer upon it one of the three kinematics of the following kinematic group: immobilization in a given angular position, a so-called slow speed of rotation for milling operations which are not parallel to the axis (C), and a so-called high speed for the turning.

U.S. Pat. No. 5,154,643 issued to Catania et al. teaches a method and apparatus for positioning tooling with respect to an arc-shaped workpiece assembly spaced radially away from a centerline. The apparatus includes axially spaced apart support arm assemblies which are swingable about the centerline. Each support arm is provided with a fixed portion and a radially inwardly and outwardly movable portion, the movable portions of both arm assemblies being simultaneously movable under the control of a CNC controller. The ends of inner and outer beams are supported by the radially movable portion. Supported upon each of the inner and outer beams is a carriage assembly movable along the beam. A head is supported upon each of the carriages, each head having a relatively stationary half and a shiftable half, the shiftable half being mounted upon a track carried by the stationary half to provide for movement about a center point. In operation the beams will be swung to their position about the centerline, the carriages will be moved to their desired positions, at least one of the heads will be extended, and the tooling will be advanced towards the workpiece, all of this movement being controlled by the CNC controller. To permit loading of the apparatus, the inner beam may be split and shifted axially outwardly as the workpiece assembly is loaded.

U.S. Pat. No. 5,214,972 issued to Larson et al. discloses a linear electromechanical actuator which includes back-to-back crew-type actuators whose screw nuts are secured together. During operation, the leadscrew of one screw-type actuator is rotated whiled the leadscrew of the other screw-type actuator is locked.

A need thus exists for a machine to move a low-reaction force cutting tool, such as a water jet, laser, or high speed router, in a desired path while maintaining accuracy and environmental sealing integrity of the machine.

A need also exists for a modular machine such that a custom sized or configured machine can be easily made by merely changing the lengths of components for the axes, and bolting axes to a structural frame and to each other's moving carriages; thereby obtaining structurally rigid and accurate elements which are supported at discrete points which is a key to obtaining modular high accuracy.

A need also exists for a machine having axes that are readily completely sealable by a bellows such that no critical motion components such as the bearings, ballscrews, motors, or sensors, can be reached by a high pressure abrasive misting action from the cutting process.

A further need exists for machine axes that are most efficient in torsion so that angular errors caused by gravity loads or light reaction force loads will cause minimal angular errors which, when amplified by linear lengths of subsequently attached axes or tools will result in minimal errors at the tool-workpiece interface.

A need also exists for a machine where the linear bearings are arranged such that, when moment loads are applied to the carriage that they support, the reaction force couple on the bearings produces primarily shear stresses on the structure without creating local moments which tend to twist the axis' structure in a diaphragm mode.

SUMMARY OF THE INVENTION

The present invention is a machine tool apparatus, and a linear motion track therefore. The linear motion track is comprised of a tube having a circular cross-section with at least two bearings longitudinally disposed on opposite exterior sides of the tube such that the tube forms a pair of arches joined by the two bearings. The tube arches minimize localized bending moments when radial or moment loads received from the longitudinally slidable carriage on the tube are applied to the tube arches through the bearings. In addition to the linear motion track, the machine tool apparatus also includes a table, for supporting a workpiece, to which the linear motion track is attached, and a machine tool attached to the linear motion track.

Preferably, the linear motion track also includes a second tube attached to the first carriage, and a second carriage. The second carriage is capable of longitudinal movement on the second tube along a second (Z) axis substantially perpendicular to the first (Y) axis which defines the longitudinal movement of the first carriage along the first tube. Most preferably, a tool attaching mechanism is located on the second carriage, and the tool attaching mechanism moves a tool along a third (Z) axis that is substantially perpendicular to both the first (Y) axis and the second (Z) axis.

Most preferably, the tube of the linear motion track has a predetermined length and diameter, and can be interchanged with another tube having a second predetermined length and diameter. The drive of the machine tool apparatus that moves the carriage along the tube is most preferably an elongate screw drive located under the tube to avoid particulate contamination thereof. This drive also preferably includes a motor located within the interior of the tube, again, to avoid particulate contamination. Finally, bellows are preferably located on the tube on each side of the carriage. These bellows are slidable on the tube and connected to the carriage such that cooperative movement of the bellows and the carriage prevent particulate matter from contacting the tube.

Thus, the invention embraces a machine tool and linear motion track therefor designed for use in adverse environments, such as for high pressure jet abrasive waterjet cutting. The machine has a relatively open structure to allow large workpieces to be manipulated in the structure, while maintaining a high degree of rigidity, and therefore accuracy, and has its axes being readily tightly completely sealable with bellows to prevent any possibility of contamination, even under a high pressure mist, reaching the precision bearings and ballscrews. The machine's principal axes are modular linear motion axes that are constructed from thick walled tubing that have longitudinal grooves cut in them for the mounting of modular linear motion bearings, and a radial slot in one end of the tube with means in the center of the tube for anchoring a servo motor which is fully protected from the hostile outer environment. The servo motor drives a timing belt through the radial slot which drives a ballscrew attached to the outside of the tube. The ballscrew drives a ballnut attached to a carriage that is attached to the bearing blocks of the linear motion bearings and wraps around the tube to provide extreme structural rigidity, a surface to attach even in a cantilevered fashion other axes, and surfaces for bellows to be attached to. The tube is round so that a round bellows can be used to totally enclose the precision bearings and ballscrews. The round shapes are chosen because dirt is less likely to collect in the folds of the bellows, and the round tube is about 50% more efficient in torsion than a square tube. Torsional deflections are a dominant source of error because they cause angular deflections which are amplified by the length of other axes or tools that may be attached to the carriage. Thereby with this configuration, multiple axes can be chained together by having the first axis attached at its ends to a structural frame, and second and subsequent axes cantilevered off of the previous axes' carriages, thus attaining a modular design whose structural members are readily alterable.

BRIEF DESCRIPTION OF THE DRAWINGS

These and other features of the invention will be more fully appreciated when considered in light of the following specification and drawings in which.

DETAILED DESCRIPTION OF THE PREFERRED EMBODIMENT

Figure 1:
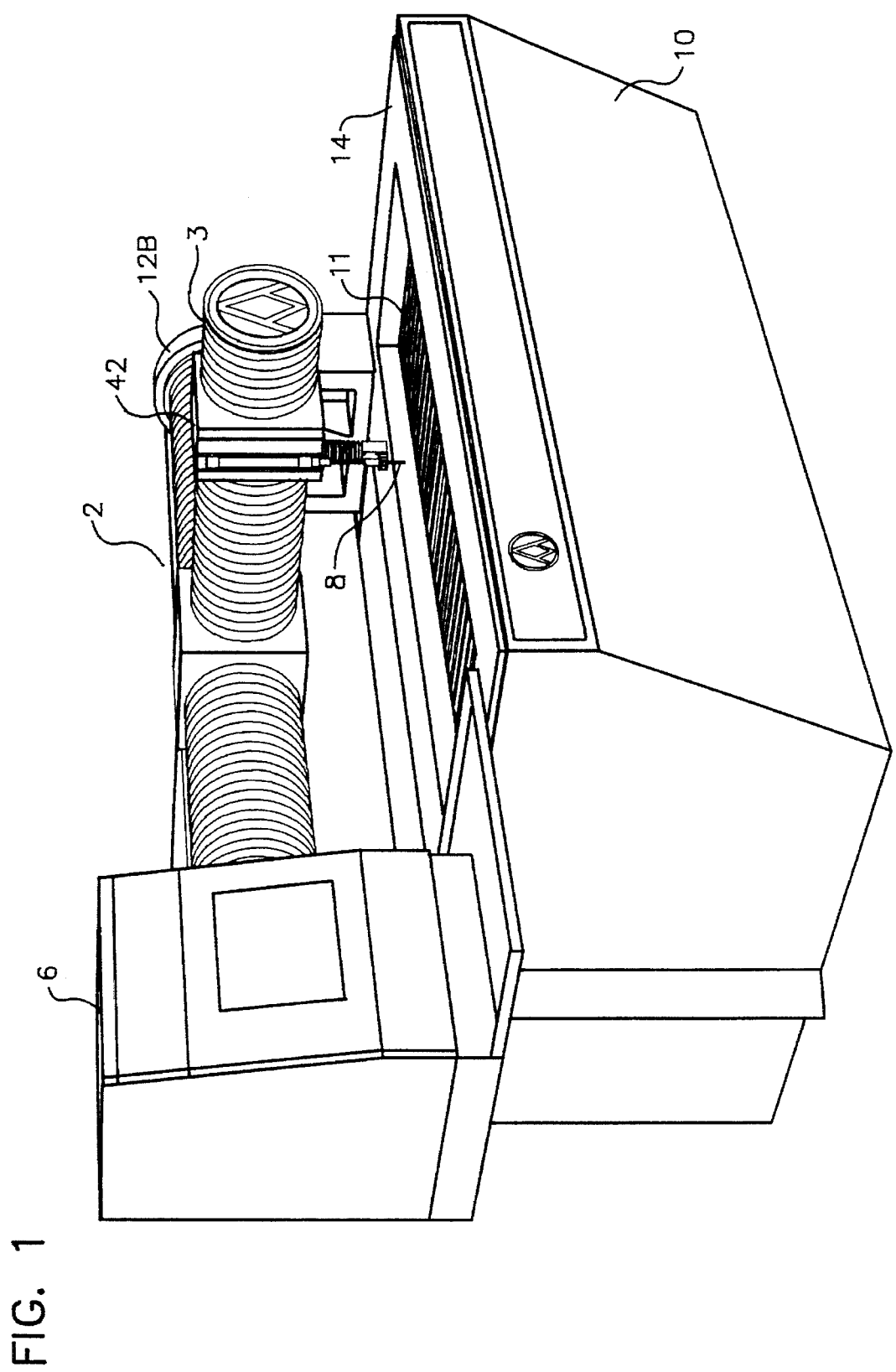
FIG. 1 is an isometric view of the machine tool apparatus and linear motion track of the present invention.
Figure 2:
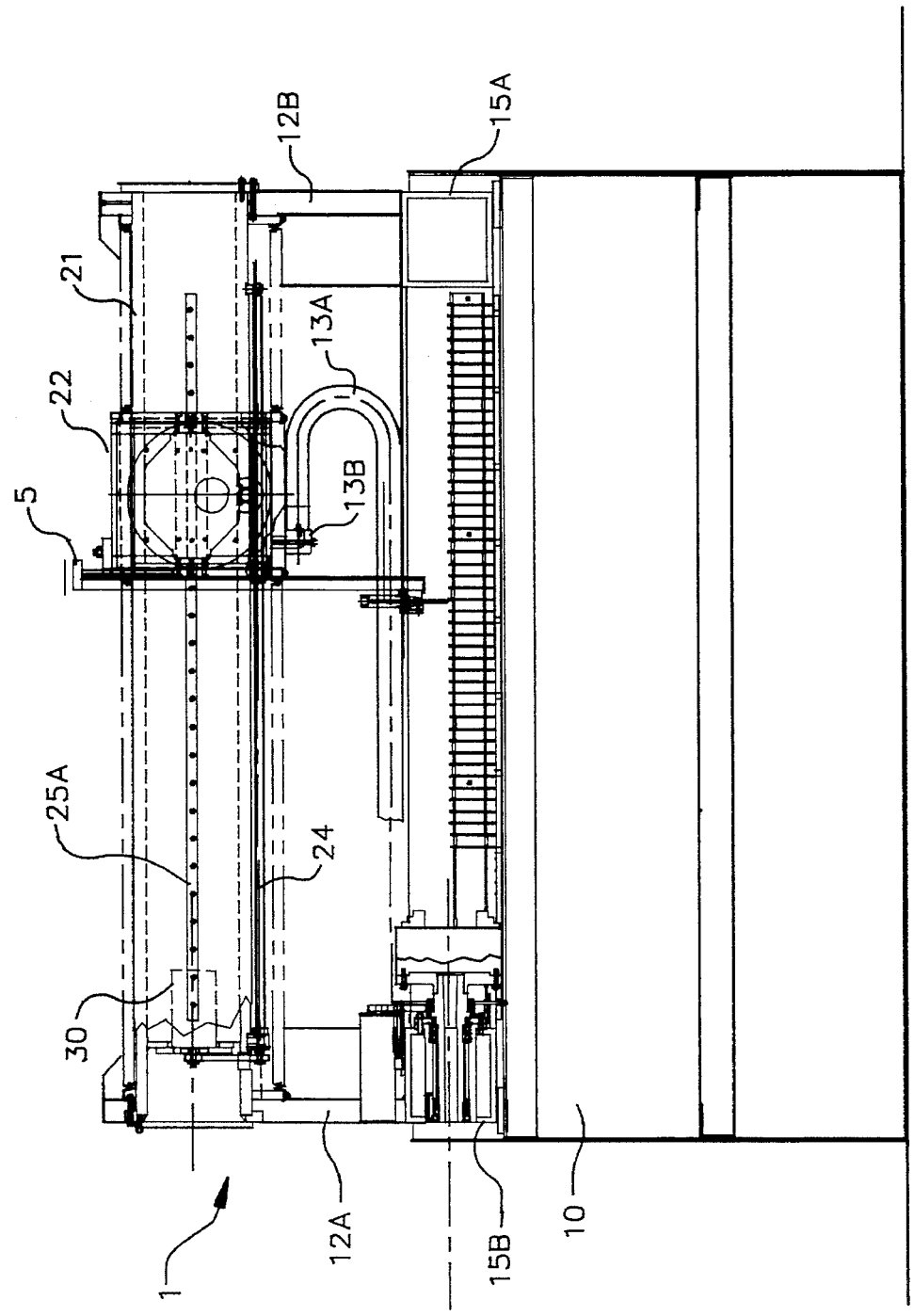
FIG. 2 is a front view of the machine tool apparatus and linear motion track of the present invention.
Figure 3:
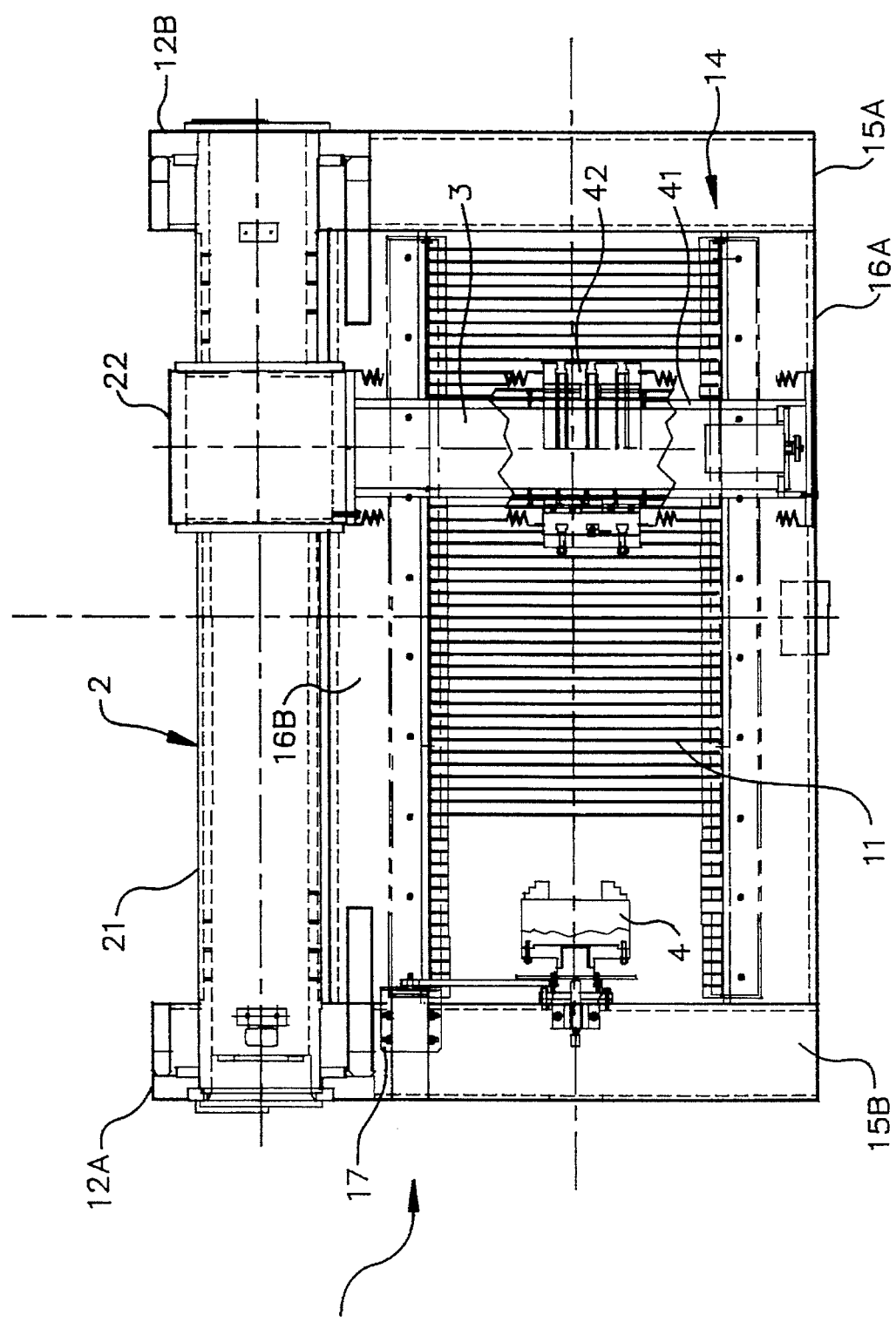
FIG. 3 is a top view of the machine tool apparatus and linear motion track of the present invention.

Machine tool apparatus and linear motion track 1, as shown in FIGS. 1 through 3, is comprised of a base structure 14 with a hollow center in which rest consumable workpiece supports 11 and a modular X axis 2 attached to the frame 14 by uprights 12A and 12B. Modular X axis 2 has a movable carriage 22 to which the modular Y axis 3 is attached. Modular Y axis 3 has a movable carriage 42 attached thereto, to which is attached a modular Z axis 5. Tool 8, such as a water jet nozzle, is attached to modular Z axis 5. Power to the tool 8 is provided by modular power unit 6. The workpiece may rest on the consumable slats 11 or it may be held in a rotary axis 4. Cutting waste is collected in the tank 10 on which the machine 1 rests.

A preferred embodiment of the machine tool apparatus and linear motion track 1 is shown in FIGS. 2–9 which shows the machine tool apparatus and linear motion track 1 as an open C frame structure where the principle axes of linear motion are an X axis 2 in a horizontal plane along the back of the C and a Y axis 3 cantilevered off of linear moving carriage 22 of axis 2 projecting forward horizontally to form an XY motion system, an optional vertical linear motion Z axes 5 for tool height adjustment connected to linear moving carriage 42 of axis 3, and an optional rotary motion axis 4 driven by motor system 17 and anchored to the frame 14 for holding round workpieces. The tool can be a high pressure waterjet nozzle 8, routing head, or laser beam focusing and pointing mechanism attached to the vertical linear motion Z axis 5 that is attached to the Y motion carriage 42. Many other combinations of the modular tube sections are also possible. XY, XZ, YZ, axis combinations can all have applications in particular fields. Even rotary axes (theta) can be added. In all cases, it is the unique modular tube design with its internal motor and air-tight bellows seal (discussed below) that eases the task of design and assembly. Tube diameter and length to meet the accuracy needs as predicted by an error budget analysis shown below is thus the major design criterion.

Figure 5:
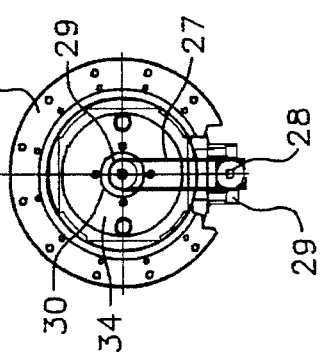
FIG. 5 is an end view of the modular X axis of the machine tool apparatus and linear motion track of the present invention.

It is preferred for the X axis 2 (the rear axis) to be raised so the bellows 26A and 26B, shown in FIG. 5, can totally enclose and essentially make an airtight seal of the axes. This is in contrast to many other types of machines that have had waterjet cutters added to them, because other machines have used rectangular bellows that are channel shaped with the hope that a labyrinth seal would protect the axes. In practice, the fine abrasive mist generated when starting a cut (piercing) penetrates every fold and opening. The closed design presented here is impervious to this effect. The raised rear axis also makes it possible to feed a large sheet of material through the machine and out the back. With roll feeders synchronized to the machine axes, it is possible to continuously cut a very large part.

As shown in FIGS. 2 and 3, the frame 14 is made from welded aluminum tube and plate. The front member 16A and the rear member 16B are welded to the side members 15A and 15B. These side members 15A and 15B project behind the rear member 16B and provide a base for the vertical members 12A and 12B to be anchored to. These upright, vertical members 12A and 12B are the support points for the ends of three main structural tube 21 of X axis 2. One end of the tube 21 has a plate 33A welded to it with holes that are bolted through to the upright 12A. This transfers torques from the tube 21 to the upright 12A and down into the frame 14.

A workpiece is held either in the rotary axis 4 or rests flat on the consumable slats 11, which are supported by frame 14. The frame 14 rests on the tank 10, which serves as a catch basin for cutting waste products. In the case of a water jet system, the tank 10 is filled with water which serves to decelerate the jet as it leaves the cutting region.

Figure 4:
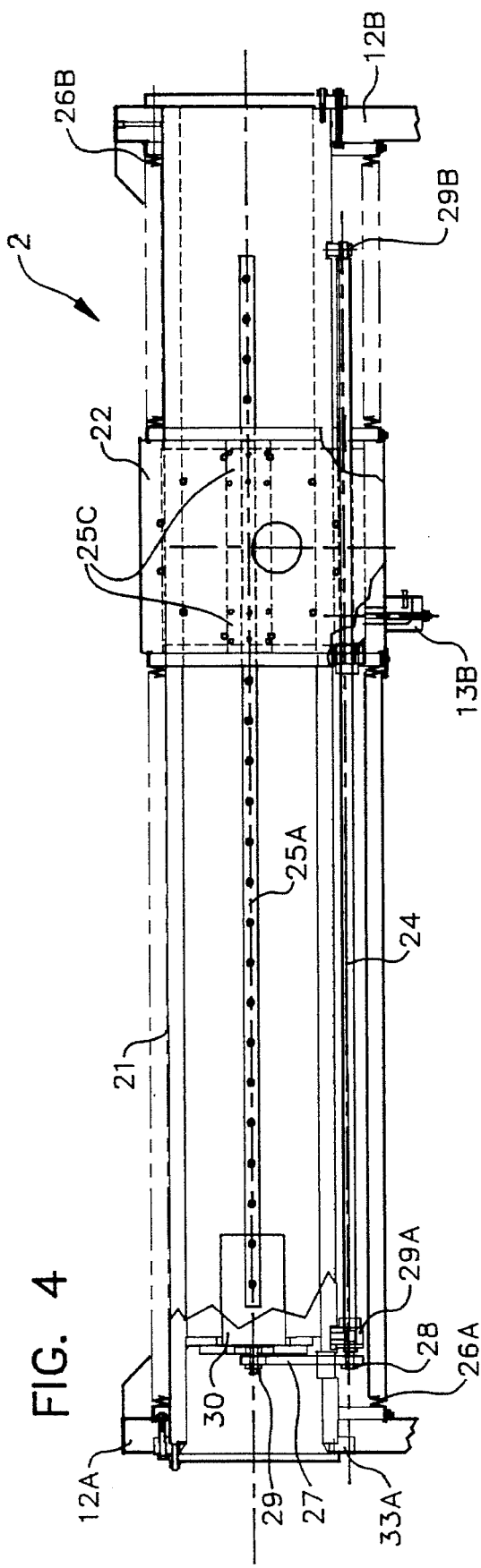
FIG. 4 is a front view of the modular X axis of the machine tool apparatus and linear motion track of the present invention.

As shown in FIG. 2, power is transmitted to the X axis carriage 22 by a cable carrier 13A which is anchored to the carriage at 13B. The power and signals to the motor 30 cause the motor 30 to turn. As shown in FIGS. 4 and 5, the power from the motor is transmitted through a pulley 29 to a timing belt 27 to a pulley 28 attached to the end of the ballscrew 24 shown in FIG. 2. As shown in FIG. 4, the ballscrew 24 is supported at its ends by bearing systems 29A and 29B. The ballscrew nut 24A is attached to the X axis carriage 22 such that ballscrew 24 moves X axis carriage 22 longitudinally along tube 21. Note that the ballscrew 24 is positioned on the underside of the tube 21 so that the force produced is closer to the tool-workpiece interface; if a routing head were used, there would be less of a moment and resulting error motions on the system. Placing the ballscrew 24 on the underside also reduces the chance of damage should a heavy part be dropped on the machine.

As shown in FIG. 5, the motor is attached to a plate 34 which is inside the tube 21 and perpendicular to the tube axis. Tension in the timing belt 27 is adjusted by radially adjusting the position of the plate 34 with jackscrews, known to those skilled in the art. Once adjusted, the plate 34 is then anchored to the tube 21 with bolts also known in the art.

Figure 6:
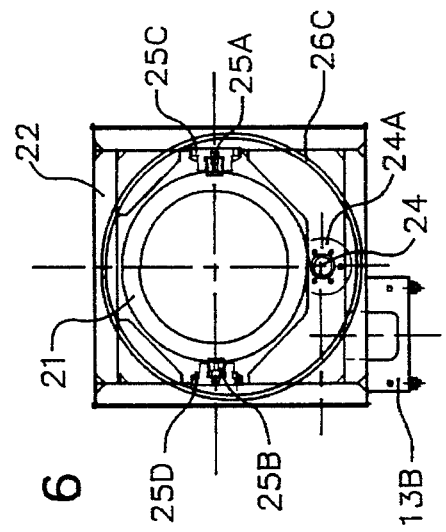
FIG. 6 is cross section view of the modular X axis through the carriage of the machine tool apparatus and linear motion track of the present invention.

The X axis carriage 22 is slidably supported on the exterior of the tube 21 by linear motion bearing carriage sets 25C and 25D, which ride on linear motion bearing rails 25A and 25B located on the exterior of tube 21 as shown in FIG. 6 and FIG. 4. The bearing rails 25A and 25B are set in grooves machined in the tube 21. This allows the tube 21 to be a plain low cost structural tube, typically aluminum for corrosion resistance and ease of machining. The rough structural tube has precision grooves cut into it which then serve as the precision surfaces to which the linear motion bearing rails 25A and 25B are bolted. The X axis carriage 22 is then placed over the bearing carriages 25C and 25D and is positioned with respect to them. To reduce costs, the inside surface of the carriage should be larger than the carriage surfaces requires. A replication epoxy (e.g., DWH available from Devitt Machinery Co. in Aston, Pa.) is then injected between the bearing carriages 25C and 25D and the inside of the X axis carriage 22. After the epoxy has hardened, the bolts are tightened, which firmly locks the X axis carriage 22 to the bearing carriages 25C and 25D, thereby putting the thin epoxy layer into compression.

The X axis 2 is sealed totally by round bellows 26A and 26B. Each of the two bellows fits over one side of tube 21 and is attached to one end of tube 21 and to the carriage 22 such as 26C shown in FIG. 6. Since these bellows 26A and 26B are round, when abrasive grit is sprayed on them, as they expand and contract, the grit tends to slide off of the bellows and does not collect as it would on rectangular bellows.

Figure 7:
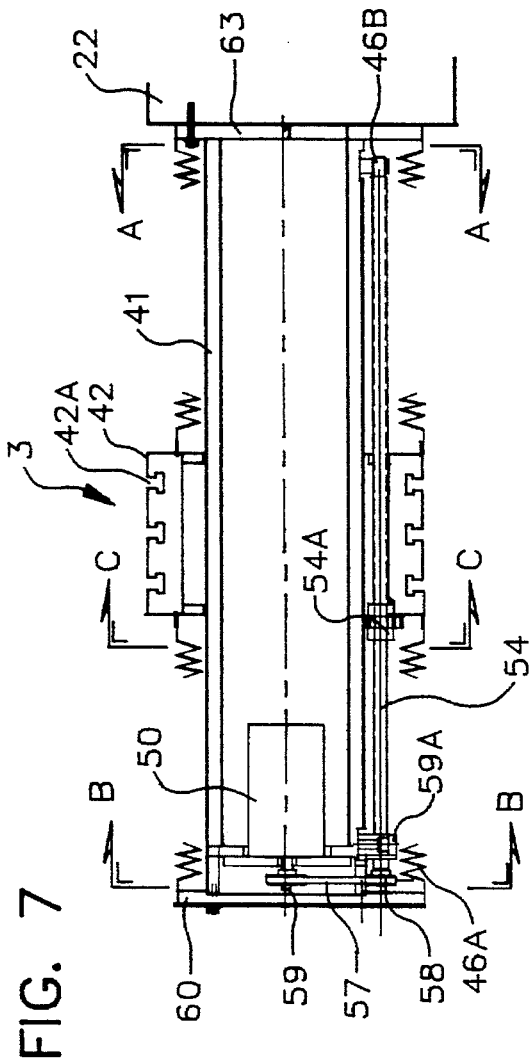
FIG. 7 is a front view of the modular Y axis of the machine tool apparatus and linear motion track of the present invention.
Figure 9:
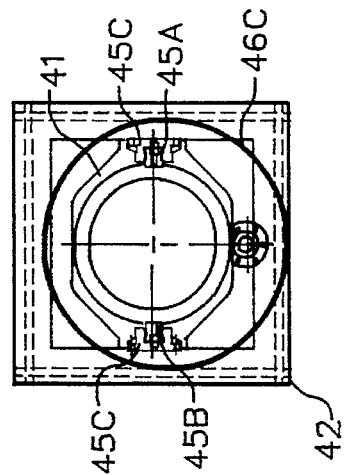
FIG. 9 is cross section view of the modular Y axis through the carriage.
Figure 8:
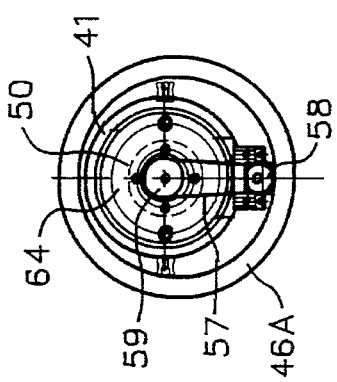
FIG. 8 is a cross section end view of the modular X axis of the machine tool apparatus and linear motion track of the present invention.

The Y axis 3 is detailed in FIGS. 7–9, and its construction is essentially the same as that of the X axis 2, owing to the modularity of the design concept of this invention. As shown in FIG. 7, a structural tube 41 has a plate 63 welded to it which is bolted to the X axis carriage 22. Bellows 46B and 46A are each located on a side of tube 21 and are each connected to an end of the tube 41 at plates 60 and 63 and to the carriage 42 with a thin short bellows section such as 46C shown in FIG. 9. These round bellows 46A and 46B effectively seal the Y axis 3, and abrasive dirt tends to fall off the Y axis 3 from between the folds as the bellows 46A and 46B expand and contract.

As shown in FIG. 7, the Y axis carriage 42 has T-slots 42A cut in its outer surface to facilitate mounting of tools and an optional Z motion axis. The Y motion carriage 42 is longitudinally slidable on the tube 41 by linear motion bearing blocks 45C and 45D, which are slidably attached to linear bearing rails 45A and 45B that are anchored in grooves that are cut in the tube 41. As shown in FIG. 7, the carriage Y 42 is moved by a force from the ballscrew nut 54A, which is attached to the Y axis carriage 42. Force on the ballscrew nut 54A is generated when the ballscrew 54, which is supported in modular bearing units 59A and 59B, is turned by a timing belt 57 that engages teeth on pulleys 58 and 59. Pulleys 58 and 59 are attached to the ballscrew 54 and motor 50, respectively.

As with the X axis motor, as shown in FIG. 8, the Y axis motor 50 is attached to a plate 64 that is inside and perpendicular to the tube 41. This plate's radial position is adjusted by screws inside the tube which adjusts the timing belt 57 tension.

The use of a round tube maximizes the torsional rigidity of the beam, and also increases the efficiency of load transfer between the linear bearings and the tube. Specifically, the round tube acts as an arch locally where the bearing rails are attached to the tube. Because arches are structurally efficient, this minimizes local bending effects of the tube's walls when radial or moment loads are applied to the carriage which are transferred to the tube via the bearings. In addition, the bearings are diametrically opposed to each other on the tube. When a moment load is applied to the carriage, the reaction forces of the bearing blocks are opposed to each other and are tangent to the tube walls. Thus there is no force in a radial direction along the tube wall, and the reaction forces are most efficiently transferred to the structure of the tube. The round tube resists these loads with a circular distribution of shear stresses in the tube's walls, which, because there are no corners, produce no stress concentrations. This minimizes deflection and maximizes efficiency of load transfer between the carriage to the bearings to the tube to the frame. From Rourke[1]:

[1] R. Rourke and W. Young *Formulas for Stress and Strain*, Fifth Edition, McGraw-Hill Book Company, NY, page 292–293.

$$\theta_{twist} = T_{(torque)} L_{(length)} / (K_{(torsional\ stiffness)} G_{(shear\ modulus)});$$

$$K_{(torsional\ stiffness\ hollow\ round\ shaft)} = \pi(D_o^4 - D_i^4)/32;\ \text{and}$$

$$K_{(torsional\ stiffness\ hollow\ square\ shaft)} = t(h-t)^3.$$

where $D_o$ and $D_i$ are the inner and outer diameters respectively of the round shaft, and h and t are the outside dimension and wall thickness, respectively, of a square tube. Table 1 shows a numerical comparison which is also documented in Tables 3 and 4, below:

TABLE 1

Square verses Round Tube

|  | round | square |
|---|---|---|
| Tube OD | 254 | 254 |
| tube wall thickness | 25.4 | 25.4 |
| Bending Inertia | 7.03E–05 | 0.00012 |
| Torsion factor K | 0.000141 | 0.0003 |
| Torsion ratio square/round defl. | — | 2.16 |
| Deflection ratio round/square defl. | — | 1.70 |

The round shaft bends more than a square shaft (by a factor of 1.7), but twists even less (by a factor of 2.16). Thus, since angular deflections are worse because they are amplified by the distance to the tool, a round shaft is a superior choice for this type of design.

The design of a modular system incorporating the objects of this invention is aided by the use of a spreadsheet to calculate deflections of components and the resulting error motions at the tool tip of the system. The technique of error budgeting is discussed in detail in the textbook *Precision Machine Design* by Alexander H. Slocum (©1992 by Prentice-Hall, Inc. ISBN 0-13-719972-4). As applied to the preferred embodiment of the subject invention, spreadsheet-based calculations of errors in the system is shown in Table 2 as well as in Tables 3 and 4:

TABLE 2

| Property | X axis | Y axis |
|---|---|---|
| Linear guide size | 20 | 15 |
| Linear guide block length | 70 | 55 |
| width of axis (Nx lg block) | 4 | 3 |
| Width of carriage | 280 | 165 |
| Axis stroke | 1219 | 610 |
| Bellows Lmax/Lmin | 8 | 8 |
| Collapsed bellows length | 305 | 152 |
| End flanges for bellows | 20 | 20 |
| Axis length | 1824 | 947 |
| Load applied at tip along a direction (N) |  | 250 250 |
| Tube OD (mm) | 254 | 203.2 |
| Tube ID (mm) | 203.2 | 177.8 |
| Wall | 25.4 | 12.7 |
| Tube I | 1.21E–04 | 3.46E–05 |
| Density | 2.70E+03 | 2.70E+03 |
| Mass | 89.84 | 19.43 |
| Cost/kilo | $5.50 | $5.50 |
| Cost | $494.10 | $106.89 |
| Modulus | 6.9E+10 | 6.9E+10 |
| Beam length (mm) | 1824 | 947 |
| X Deflection (μm) at jet | 5 | 30 |
| Y Deflection (μm) at jet | 8 | 1 |
| Z Deflection (μm) at jet | 8 | 30 |
| Z Deflection (μm) own weight | 8 | 8 |
| Torsional moment (N-m) | 237 |  |
| twist angle (rad) | 1.69E–05 |  |
| Z torsion @ x error (μm) at jet | 16 |  |
| Estimated tool tip error from load applied along X, Y, or Z axis |  |  |
| Total est. error equals 2*Sum defl. mm |  |  |
| Total estimated machine error X (mm, in) |  | 0.069 |
| Total estimated machine error Y (mm, in) |  | 0.018 |
| Total estimated machine error Z (mm, in) |  | 0.140 |

TABLE 3

| Enter numbers in bold Property | X axis | Y axis |
| --- | --- | --- |
| Linear guide size (mm) | 20 | 15 |
| Linear guide block length (mm) | 70 | 55 |
| Width of axis (Nx lg block) (mm) | 4 | 3 |
| Width of carriage (mm) | 280 | 165 |
| Axis stroke (mm) | 1219 | 610 |
| Bellows Lmax/Lmin | 8 | 8 |
| Collapsed bellows length (mm) | 305 | 152 |
| End flanges for bellows (mm) | 20 | 20 |
| Axis length (mm) | 1824 | 947 |
| Load applied at tip along a direction (N) | 250 | 250 |
| Tube OD (mm) | 254 | 203.2 |
| Tube ID (mm) | 203.2 | 177.8 |
| Wall (mm) | 25.4 | 12.7 |
| Tube Inertia (m^4) | 1.21E−04 | 3.46E−05 |
| Density (kg/m^3) | 2.70E+03 | 2.70E+03 |
| Mass (kg) | 89.84 | 19.43 |
| Cost/kilo | $5.50 | $5.50 |
| Cost | $494.10 | $106.89 |
| Modulus (Pa) | 6.9E+10 | 6.9E+10 |
| | 1824 | 947 |
| Beam Length (mm) | 5 | 30 |
| X Deflecton (μm) at jet | 8 | 1 |
| Y Deflection (μm) at jet | 8 | 30 |
| Z Deflection (μm) at jet | | |
| Z deflection (μM) own weight | 8 | 8 |
| Torsional moment (N-m) | 237 | |
| twist angle (rad) | 1.69E−05 | |
| Z torsion @ x error (μm) at jet | 16 | |
| Estimated took tip error from load applied X, Y, or Z axis | | |
| Total est. error equals 2*Sum defl. | | |
| Total estimated machine error X (mm) | 0.069 | |
| Total estimated machine error Y (mm) | 0.018 | |
| Total estimated machine error Z (mm) | 0.140 | |
| Square verses round tube | round | square |
| Tube OD | 254 | 254 |
| tube wall thickness | 25.4 | 25.4 |
| Bending inertia | 7.026E−05 | 0.000119 |
| Torsion factor K | 0.0001405 | 0.000303 |
| Torsion ratio square/round defl. | 2.16 | |
| Deflection ratio square/round defl. | 1.70 | |

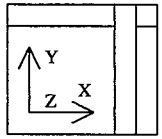

TABLE 4

| Enter numbers in bold Property | X axis | Y axis |
| --- | --- | --- |
| Linear guide size (mm) | 20 | 15 |
| Linear guide block length (mm) | 70 | 55 |
| Width of axis (Nx lg block) (mm) | 4 | 3 |
| Width of carriage (mm) | =B5*B4 | =C5*C4 |
| Axis stroke (mm) | =48*25.4 | =24*25.4 |
| Bellows Lmax/Lmin | 8 | 8 |
| Collapsed bellows length (mm) | =2*B7/B8 | =2*C7/C8 |
| End flanges for bellows (mm) | 20 | 20 |
| Axis length (mm) | =B10+B9+B7+B6 | =C10+C9+C7+C6 |
| Load applied at tip along a direction (N) | 250 | =B12 |
| Tube OD (mm) | =10*25.4 | =8*25.4 |
| Tube ID (mm) | =B15−2*25.4*1 | =C15−2*25.4*0.5 |
| Wall (mm) | =(B15−B16)/2 | =(C15−C16)/2 |
| Tube Inertia I (m^4) | =PI()*((B15/1000)^4−(B16/1000)^4)/64 | =PI()*((C15/1000)^4−(C16/1000)^4)/64 |
| Density (kg/m^3) | 2700 | =B19 |
| Mass (kg) | =B19*PI()*((B15/2000)^2−(B16/2000)^2)*(B11/1000) | =C19*PI()*((C15/2000)^2−(C16/2000)^2)*(C11/1000) |
| Cost/kilo | =2.5*2.2 | =B21 |

TABLE 4-continued

| Enter numbers in bold Property | X axis | Y axis |
|---|---|---|
| Cost | =B21*B20 | =C21*C20 |
| Modulus (Pa) | =6900*10^7 | =6900*10^7 |
| Beam length (mm) | =B11 | =C11 |
| X Deflection (μm) at jet | =1000000*((B12*B24/2000)/(B23*((B15/2000)^2–(B16/2000)^2))+(C24/1000)*B30*(B24/1000)/(12*B23*B18)) | =1000000*C12*(C24/1000)^3/(3*C18*C23) |
| Y Deflection (μm) at jet | =1000000*B12*(B24/1000)^3/(24*B18*B23) | =1000000*(C12*C24/1000)/(C23*((C15/2000)^2–(C16/2000)^2) |
| Z Deflection (μm) at jet | =1000000*B12*(B24/1000)^3/(24*B18*B23) | =1000000*(C12*C24/1000)^3/(3*C18*C23) |
| Z deflection (μM) own weight | =1000000*5*(B20*9.8)*(B24/1000)^3/(384*B23*B18) | =1000000*(C20*9.8)*(C24/1000)^3/(8*C23*C18) |
| Torsional moment (N-m) | =C24*C12/1000 | |
| twist angle (rad) | =(B30*B24/4000)/((B23/2.6)*PI()*((B15/1000)^4–(B16/1000)^4)/32) | |
| Z torsion @ x error (μm) at jet | =1000000*B31*C24/1000 | |
| Estimated tool tip error from load | applied along X, Y, or Z axis | |
| Total est. error equals 2*Sum defl. | | |
| Total estimated machine error X (mm) | =2*(B25+C25)/1000 | |
| Total estimated machine error Y (mm) | =2*(B27+C27)/1000 | |
| Total estimated machine error Z (mm) | =2*(B28+C28+B32+B29+C29)/1000 | |
| Square verses round tube | round | square |
| Tube OD | =B15 | =B41 |
| tube wall thickness | =(B15–B16)/2 | =B42 |
| Bending inertia | =PI()*((B41/1000)^4–((B41–B42)/1000)^4)/64 | =((C41/1000)^4–((C41–C42)/1000)^4)/12 |
| Torsion factor K | =PI()*((B41/1000)^4–((B41–B42)/1000)^4)/32 | =C42*(C41–C42)^3/1000)^4 |
| Torsion ratio square/round defl. | =C44/B44 | |
| Deflection ratio round/square defl | =(C43/B43) | |

These types of calculations are known to those skilled in the art of precision machine design, and are discussed in detail in the above referenced text.

While preferred embodiments of the invention have been illustrated and described in will be appreciated that various changes can be made therein without departing from the spirit and scope of the invention.

I claim:

1. A linear motion track for a machine tool apparatus comprising:
   an integral tube having a circular cross-section with a circular outside diameter;
   at least two bearing means longitudinally disposed in grooves on opposite exterior sides of said tube, said grooves being in said circular outside diameter of said tube;
   carriage means capable of longitudinal movement along said tube on said bearing means; and
   drive means for causing said longitudinal movement of said carriage means, said tube forming a pair of arches joined by said bearing means, said tube arches minimizing localized bending moments when radial or moment loads applied to said carriage are transferred to said tube arches through said bearing means.

2. The linear motion track of claim 1 wherein said carriage means moves horizontally along a first axis on said tube and said linear motion track further comprises a second tube attached to said carriage means and a second carriage means on said second tube, said second carriage means capable of longitudinal movement on said second tube along a second axis substantially perpendicular to the first axis.

3. The linear motion track of claim 1 further comprising tool attaching means on said second carriage means, said tool attaching means causing a tool to move along a third axis substantially perpendicular to both the first axis and the second axis.

4. The linear motion track of claim 1 wherein said tube has a first predetermined length and diameter and can be interchanged with another tube having a second predetermined length and diameter.

5. The linear motion track of claim 1 wherein said drive means includes an elongate screw drive located under said tube.

6. The linear motion track of claim 1 wherein said drive means includes a motor within the interior of said tube.

7. The linear motion track of claim 1 further comprising bellows over said tube on each side of said carriage means, said bellows being compressible along the length of said tube and connected to said carriage means whereby cooperative movement of said bellows and said carriage means prevents particulate matter from contacting said tube.

8. A machine tool apparatus comprising:
   a table for supporting a workpiece;
   a linear motion track attached to said table, said linear motion track comprising an integral tube having a circular cross-section with a circular outside diameter;
   at least two bearing means longitudinally disposed in grooves on opposite exterior sides of said tube, said grooves being in said circular outside diameter of said tube; carriage means capable of longitudinal movement along said tube on said bearing means; and drive means for causing said longitudinal movement of said carriage means, said tube forming a pair of arches joined by said bearing means, said tube arches minimizing localized bending moments when radial or moment loads applied to said carriage are transferred to said tube arches through said bearing means; and a machine tool attached to said linear motion track.

9. The machine tool apparatus of claim 8 wherein said carriage means moves horizontally along a first axis on said tube and said linear motion track further comprises a second tube attached to said carriage means and a second carriage means on said second tube, said second carriage means capable of longitudinal movement on said second tube along a second axis substantially perpendicular to the first axis.

10. The machine tool apparatus of claim 9 wherein said linear motion track further comprises tool attaching means on said second carriage means, said tool attaching means causing a tool to move along a third axis substantially perpendicular to both the first axis and the second axis.

11. The machine tool apparatus of claim 8 wherein said tube has a first predetermined length and diameter and can be interchanged with another tube having a second predetermined length and diameter.

12. The machine tool apparatus of claim 8 wherein said drive means includes an elongate screw drive located under said tube.

13. The machine tool apparatus of claim 8 wherein said drive means includes a motor within the interior of said tube.

14. The machine tool apparatus of claim 8 further comprising bellows over said tube on each side of said carriage means, said bellows being compressible along the length of said tube and connected to said carriage means whereby cooperative movement of said bellows and said carriage means prevents particulate matter from contacting said tube.

15. A linear motion track for a machine tool apparatus comprising:
   a tube having a circular cross-section;
   at least two bearing means longitudinally disposed in grooves on opposite exterior sides of said tube;
   carriage means capable of longitudinal movement along said tube on said bearing means;
   bellows on each side of said carriage means, said bellows being compressible along the length of said tube and connected to said carriage means whereby cooperative movement of said bellows and said carriage means prevents particulate matter from contacting said tube; and
   drive means for causing said longitudinal movement of said carriage means, said drive means including an elongate screw drive under said tube and a motor within the interior of said tube, said tube forming a pair of arches joined by said bearing means, said tube arches minimizing localized bending moments when radial or moment loads applied to said carriage are transferred to said tube arches through said bearing means.

16. A machine tool apparatus comprising:
   a table for supporting a workpiece;
   a linear motion track attached to said table, said linear motion track comprising a tube having a circular cross-section; at least two bearing means longitudinally disposed in grooves on opposite exterior sides of said tube; carriage means capable of longitudinal movement along said tube on said bearing means; bellows on each side of said carriage means, said bellows being compressible along the length of said tube and connected to said carriage means whereby cooperative movement of said bellows and said carriage means prevents particulate matter from contacting said tube; drive means for causing said longitudinal movement of said carriage means, said drive means including an elongate screw drive under said tube and a motor within the interior of said tube, said tube forming a pair of arches joined by said bearing means, said tube arches minimizing localized bending moments when radial or moment loads applied to said carriage are transferred to said tube arches through said bearing means; and a machine tool attached to said linear motion track.

17. A linear motion track for a machine tool apparatus comprising:
   an integral tube having a circular cross-section with a circular outside diameter;
   at least two bearing means longitudinally disposed in grooves on opposite exterior sides of said tube, said grooves being in said circular outside diameter of said tube;
   carriage means capable of longitudinal movement along said tube on said bearing means;
   bellows on each side of said carriage means, said bellows being compressible along the length of said tube and connected to said carriage means whereby cooperative movement of said bellows and said carriage means prevents particulate matter from contacting said tube; and
   drive means for causing said longitudinal movement of said carriage means, said tube forming a pair of arches joined by said bearing means, said tube arches minimizing localized bending moments when radial or moment loads applied to said carriage are transferred to said tube arches through said bearing means.

18. A machine tool apparatus comprising:
   a table for supporting a workpiece;
   a linear motion track attached to said table, said linear motion track comprising an integral tube having a circular cross-section with a circular outside diameter; at least two bearing means longitudinally disposed in grooves on opposite exterior sides of said tube, said grooves being in said circular outside diameter of said tube; carriage means capable of longitudinal movement along said tube on said bearing means; bellows on each side of said carriage means, said bellows being compressible along the length of said tube and connected to said carriage means whereby cooperative movement of said bellows and said carriage means prevents particulate matter from contacting said tube; drive means for causing said longitudinal movement of said carriage means, said tube forming a pair of arches joined by said bearing means, said tube arches minimizing localized bending moments when radial or moment loads applied to said carriage are transferred to said tube arches through said bearing means; and a machine tool attached to said linear motion track.

19. A linear motion track for a machine tool apparatus comprising:
   a tube having a circular cross-section;
   at least two bearing means longitudinally disposed in grooves on opposite exterior sides of said tube;
   carriage means capable of longitudinal movement along said tube on said bearing means; and drive means for causing said longitudinal movement of said carriage means, said drive means including an elongate screw drive under said tube and a motor within the interior of said tube, said tube forming a pair of arches joined by said bearing means, said tube arches minimizing localized bending moments when radial or moment loads applied to said carriage are transferred to said tube arches through said bearing means.

20. A machine tool apparatus comprising:

a table for supporting a workpiece;

a linear motion track attached to said table, said linear motion track comprising a tube having a circular cross-section; at least two bearing means longitudinally disposed in grooves on opposite exterior sides of said tube; carriage means capable of longitudinal movement along said tube on said bearing means; and drive means for causing said longitudinal movement of said carriage means, said drive means including an elongate screw drive under said tube and a motor within the interior of said tube, said tube forming a pair of arches joined by said bearing means, said tube arches minimizing localized bending moments when radial or moment loads applied to said carriage are transferred to said tube arches through said bearing means; and a machine tool attached to said linear motion track.

21. A linear motion track for a machine tool apparatus comprising:

a tube having a circular cross-section;

at least two bearing means longitudinally disposed in grooves on opposite exterior sides of said tube;

carriage means capable of longitudinal movement along said tube on said bearing means; and drive means for causing said longitudinal movement of said carriage means, said drive means including an elongate screw drive located under said tube, said tube forming a pair of arches joined by said bearing means, said tube arches minimizing localized bending moments when radial or moment loads applied to said carriage are transferred to said tube arches through said bearing means.

22. A linear motion track for a machine tool apparatus comprising:

a tube having a circular cross-section;

at least two bearing means longitudinally disposed in grooves on opposite exterior sides of said tube;

carriage means capable of longitudinal movement along said tube on said bearing means; and drive means for causing said longitudinal movement of said carriage means, said drive means including a motor within the interior of said tube, said tube forming a pair of arches joined by said bearing means, said tube arches minimizing localized bending moments when radial or moment loads applied to said carriage are transferred to said tube arches through said bearing means.

23. A machine tool apparatus comprising:

a table for supporting a workpiece;

a linear motion track attached to said table, said linear motion track comprising a tube having a circular cross-section; at least two bearing means longitudinally disposed in grooves on opposite exterior sides of said tube; carriage means capable of longitudinal movement along said tube on said bearing means; and drive means for causing said longitudinal movement of said carriage means, said drive means including an elongate screw drive located under said tube, said tube forming a pair of arches joined by said bearing means, said tube arches minimizing localized bending moments when radial or moment loads applied to said carriage are transferred to said tube arches through said bearing means; and a machine tool attached to said linear motion track.

24. A machine tool apparatus comprising:

a table for supporting a workpiece;

a linear motion track attached to said table, said linear motion track comprising a tube having a circular cross-section; at least two bearing means longitudinally disposed in grooves on opposite exterior sides of said tube; carriage means capable of longitudinal movement along said tube on said bearing means; and drive means for causing said longitudinal movement of said carriage means, said drive means including a motor within the interior of said tube, said tube forming a pair of arches joined by said bearing means, said tube arches minimizing localized bending moments when radial or moment loads applied to said carriage are transferred to said tube arches through said bearing means; and a machine tool attached to said linear motion track.

25. A linear motion track for a machine tool apparatus comprising:

a carriage support;

bearing means on said carriage support;

carriage means capable of longitudinal movement along said carriage support on said bearing means; and drive means for causing said longitudinal movement of said carriage means, said drive means including an elongate screw located under said carriage support.

26. A linear motion track for a machine tool apparatus comprising:

a carriage support having an interior;

bearing means on said carriage support;

carriage means capable of longitudinal movement along said carriage support on said bearing means; and drive means for causing said longitudinal movement of said carriage means, said drive means including a motor located within the interior of said carriage support.

\* \* \* \* \*